(12) United States Patent
Agarwalla et al.

(10) Patent No.: US 7,099,873 B2
(45) Date of Patent: Aug. 29, 2006

(54) CONTENT TRANSCODING IN A CONTENT DISTRIBUTION NETWORK

(75) Inventors: Rajesh S. Agarwalla, Pittsburgh, PA (US); Bryan E. Aupperle, Apex, NC (US); Thirumale Niranjan, Pittsburgh, PA (US); Srikanth Ramamurthy, Pittsburgh, PA (US); Marcia L. Stockton, Bakersfield, CA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/157,478

(22) Filed: May 29, 2002

(65) Prior Publication Data
US 2003/0225723 A1 Dec. 4, 2003

(51) Int. Cl.
*G06F 17/00* (2006.01)
*G06F 7/00* (2006.01)

(52) U.S. Cl. ...................... 707/10; 707/104.1
(58) Field of Classification Search ............ 707/1, 707/200, 104.1, 10; 709/200
See application file for complete search history.

(56) References Cited

U.S. PATENT DOCUMENTS

2001/0056504 A1* 12/2001 Kuznetsov .................. 709/310
2003/0208638 A1* 11/2003 Abrams et al. ............. 709/328

OTHER PUBLICATIONS

Content Distribution Networks: Colophon, Jun. 1, 2001, Telematica Instituut (previously provided).*
*Guide to Edge Applications, IBM Websphere Edge Services Architecture*, IBM Corporation, (May 2001).
*WebSphere Edge Server*, IBM Corporation, <http://www-3.ibm.com/software/webservers/edgeserver/about.html>, (Apr. 20, 2002).
*IBM WebSphere Edge Server, Version 2.0 for Multiplatforms*, IBM Corporation, (Sep. 26, 2001).
*WebSphere Transcoding Publisher*, IBM Corporation <http://www-3.ibm.com/software/webservers/transcoding>, (Apr. 20, 2002).
*Interwoven OpenDeploy 5.5.1, Data Sheet*, Interwoven, Inc., (2002).

* cited by examiner

*Primary Examiner*—John R. Cottingham
*Assistant Examiner*—Kuen S. Lu
(74) *Attorney, Agent, or Firm*—Jerry W. Herndon, Esq.; Steven M. Greenberg, Esq.; Carey Rodriguez Greenberg & Paul, LLP

(57) ABSTRACT

An intermediate content transcoder. An intermediate content transcoder can include a communicative receiver configured to receive master content while in transit from a content source to at least one content sink in a content distribution network, and a communicative transmitter configured to transmit transcoded content to one or more of the content sinks. A set of content transformations also can be provided. Furthermore, the intermediate content transcoder can include a set of conditions for selecting individual ones of the content transformations to be applied to master content received through the communicative receiver. Finally, the intermediate content transcoder can include a transcoder configured to apply the selected individual ones of the content transformations to the master content. The application of the content transformations can produce transcoded content. The communicative transmitter, in turn, can forward the produced transcoded content to one or more of the content sinks.

8 Claims, 2 Drawing Sheets

CONTENT TRANSCODING IN A CONTENT DISTRIBUTION NETWORK

BACKGROUND OF THE INVENTION

1. Statement of the Technical Field

The present invention relates to content transcoding and more particularly to content transcoding in a content distribution network.

2. Description of the Related Art

I. Content Transcoding

Multiple formats, markup languages, device capabilities and network constraints have until recently threatened to limit the promise of pervasive computing. The potential of e-business as expounded upon within the technology news media can be realized only when there is a way to bridge disparate data seamlessly, transcending multiple data protocols, devices and users. Recognizing the importance of seamless data bridging, transcoding publishers have been developed which can simplify the distribution of content across disparate elements of individual networks and global internetworks.

In that regard, transcoding publishers can enable universal access to content by dynamically adapting, reformatting and filtering content and applications for presentation and interaction within multiple disparate devices, including pervasive devices such as mobile phones, personal digital assistants (PDAs) and pagers. Specifically, transcoding publishers are server-based applications that can dynamically translate content and applications into multiple markup languages and can optimize the translated content and applications for delivery to different devices, such as mobile phones and handheld computers. In consequence, it is no longer necessary to create and maintain multiple sets of Web pages since transcoding can be performed in real time to change a master version of Web content into other required formats.

II. Content Distribution

As application providers deploy content and applications over the Internet, challenges arise in the form of processing delays and network latencies. Specifically, the placement of application content in a centralized server can compel users to traverse multiple congested networks in an attempt to effectively interact with the application. As a result, this centralized approach to deploying applications on the Internet can hinder the attainment of scalability, reliability and performance levels that are considered "mission-critical" in the deployment of a business application.

In view of these challenges, and further in view of the strategic importance of delivering requested content to end users as quickly as possible, the general problem of reducing response time has received significant attention recently. Most proposed solutions have focused upon accelerating the delivery of content through distributed caching in a content distribution network. In particular, distributed caching can be performed in one or more server devices positioned strategically about the enterprise and the Internet. These server devices can include, for instance, Web servers, caching proxy servers, surrogate servers, re-hosting servers. Accordingly, as used herein, each server device can be collectively referred to as an "edge server". Notably, some edge servers include application off-loading technology designed to decompose monolithic applications into component parts which can be distributed to the edge of the network in a manner similar to content.

III. Transcoding Content in a Content Distribution Network

Content which has been transformed in a transcoding publisher often can be cached and re-served at the edge of the network in order to reduce the consumption of edge server resources. Yet, in many cases there may be a need to perform different content transformations for different recipients of the transformed content. In some cases, however, it can be inefficient to perform transcoding in an edge server. Likewise, it can be equally as inefficient to perform transcoding at the content source. For instance, the content source many not have an awareness of the type of end user device which will consume the content. Thus, undertaking a suitable content transformation can be difficult. By comparison, the resources of the edge server can become consumed where excessive transformations are required to accommodate the requirements of various content consumers.

SUMMARY OF THE INVENTION

The present invention overcomes the limitations of conventional content transcoding and provides a novel and non-obvious method, system and apparatus for performing intermediate transcoding in a content distribution network. A method for intermediate transcoding in a content distribution network can include receiving master content from a content source while the master content is in transit from the content source to a content sink in the content distribution network. A set of conditions can be evaluated for selecting particular ones of associated transformations to be applied to the master content. At least one selected transformation can be applied to the master content according to the evaluated set of conditions. In consequence, the application of the selected transformation or transformations can produce transcoded content. Subsequently, the transcoded content can be forwarded to the content sink in the content distribution network.

In one aspect of the invention, the applying step can include invoking at least one remotely disposed Web service configured to perform at least one of the selected particular ones of the associated transformations. Subsequently, the transcoded content can be received from the invoked Web service. Also, the forwarding step can include forwarding the transcoded content to at least one edge server in the content distribution network. Alternatively, the forwarding step can include the step of forwarding the transcoded content to a master content distribution server in the content distribution network. The master content distribution server, in turn, can forward the transcoded content to at least one edge server.

The present invention also can include an intermediate content transcoder. In one aspect of the present invention, an intermediate content transcoder can include a communicative receiver configured to receive master content from a content publisher, and a communicative transmitter configured to transmit transcoded content to at least one content sink. A set of content transformations also can be provided. Furthermore, the intermediate content transcoder can include a set of conditions for selecting individual ones of the content transformations to be applied to master content received through the communicative receiver. Finally, the intermediate content transcoder can include a transcoder configured to apply the selected individual ones of the content transformations to the master content.

In that regard, the application of the content transformations can produce transcoded content. The communicative transmitter, in turn, can forward the produced transcoded content to the content sink. Importantly, the set of conditions can include at least one of master content type, type of transformation requested, a transcoding policy, content sink identity, and locality. Also, the transcoder can be remotely disposed in at least one Web service. Finally, the communicative transmitter can further include a transcoding data appending processor for appending to the transcoded content data which identifies at least the master content, the transcoded content and the set of conditions.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for intermediate content transcoding in a content distribution network. In particular, in accordance with the present invention, content can be transcoded subsequent to the publishing of the content in a content source, but prior to the distribution of the content about a content distribution network in a content sink. Notably, the particular transformations performed during the transcoding process can be selectively determined according to the evaluation of a set of transcoding conditions.

Figure 1:
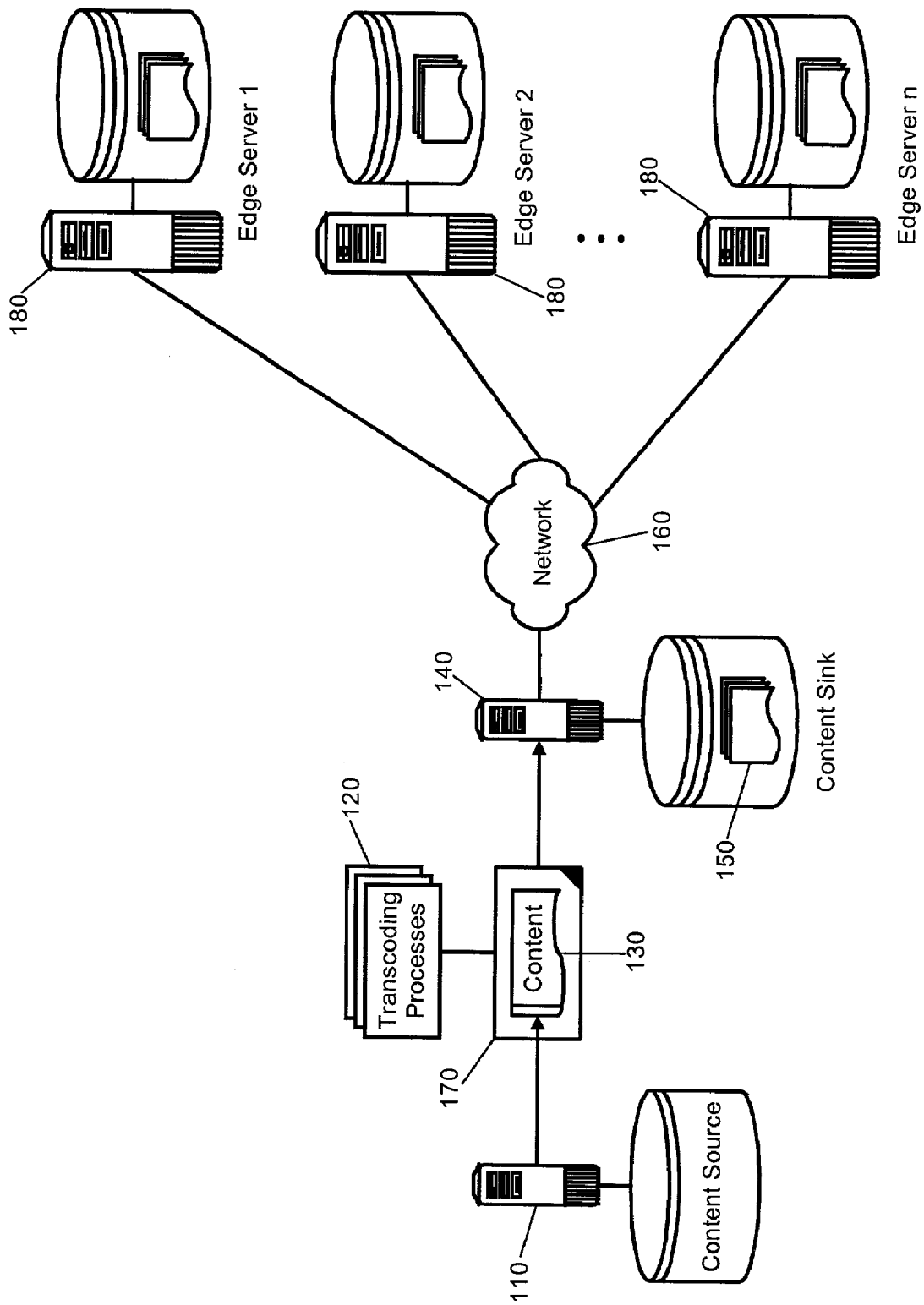
FIG. 1 is a schematic illustration of a content distribution network in which an intermediate content transcoding process can be performed; and, FIG. 2 is a block diagram illustrating a process for transcoding content in a content distribution network.

FIG. 1 is a schematic illustration of a content distribution network in which an intermediate content process can be performed. The content distribution network can include a content source 110 able to publish content 130 to a content sink 140. The content source 110 can be any source of transcodable content, such as an origin server configured to serve locally stored content, an intermediate distribution server configured to forward published content to a subsequent distribution server, or a master content distribution server configured to distribute content to one or more edge servers 180 positioned at the edge of a network 160. For example, the content source can be a "content manager" configured to place Web content onto an origin Web server which serves the content upon requests from clients.

The content sink 140, by comparison, can be any consumer of content received from the content source 110, including but not limited to a master content distribution server or an intermediate distribution server. In operation, an intermediate transcoding process 170 can receive the content 130 intermediately between content source 110 and content sink 140 and can transcode the content 130 according to selected transformations 120. Subsequently, depending upon the configuration of the content sink 140, the transcoded content can be consumed locally, distributed to another content sink, additionally transcoded by another transcoding process, or distributed to one or more edge servers 180 positioned at the edge of the network 160.

In one aspect of the invention, the content sink 140 can behave as a master content distribution server and can move Web content from origin servers to Web servers and proxy caches in the edge servers 180, as also is well-known in the art. Specifically, the role of the master content distribution server can include replicating content from the origin servers to Web servers, referred to in the art as "content rehosting", as well as updating and invalidating entries in the caches of the edge servers 180. In essence, the master content distribution server can distribute content 130 to multiple edge servers 180 consistently, so that each edge server 180 and corresponding cache serves the same content on request. Importantly, as will be apparent to one skilled in the art, the publication of content 130 in the content publisher 110 serves as the integration point between content creation and management, and content distribution.

Figure 2:
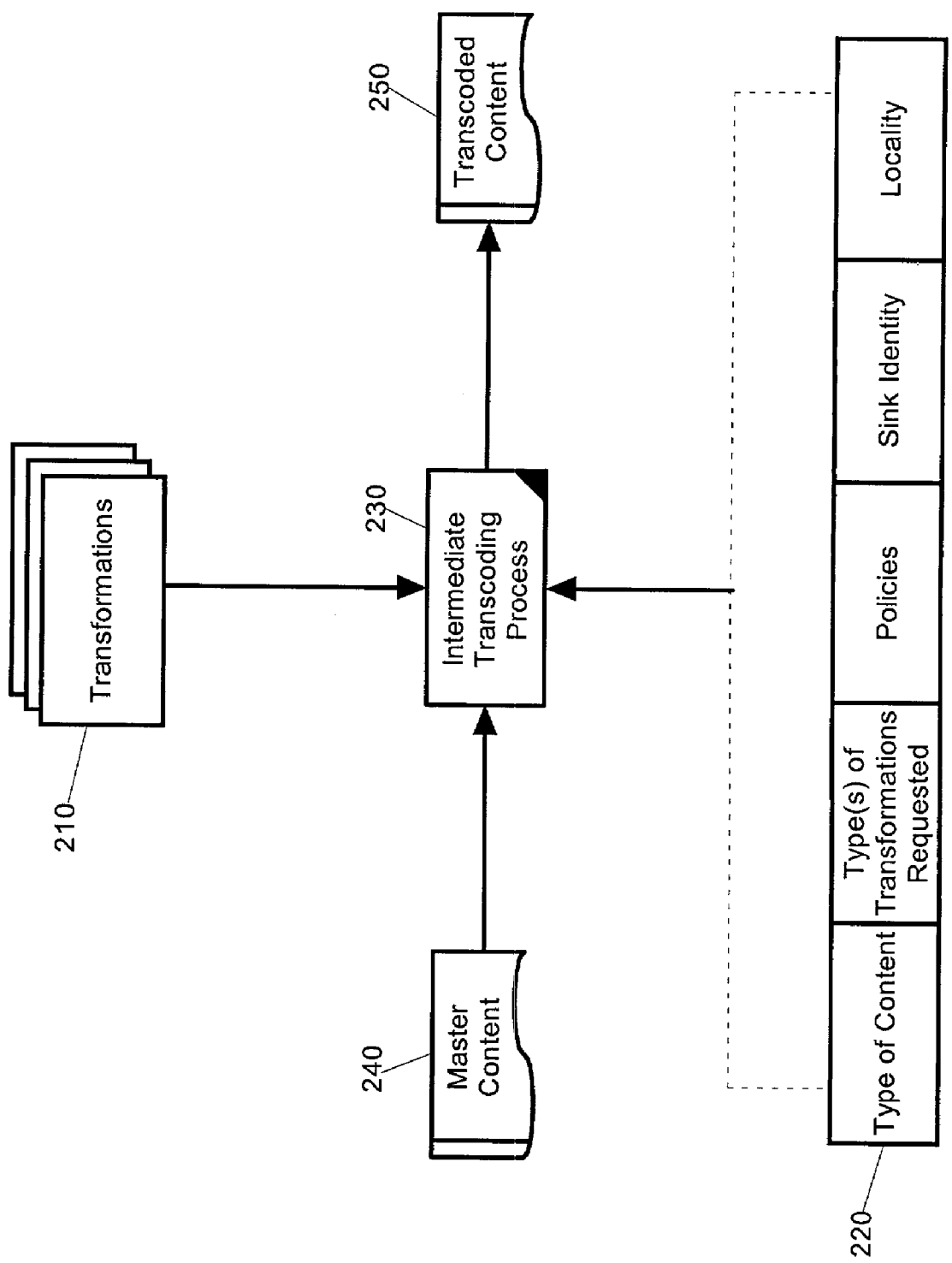

Significantly, in accordance with the present invention, content created and managed in the content source 110 can be intermediately transcoded prior to reaching the content sink 140. In particular, FIG. 2 is a block diagram illustrating a process for intermediately transcoding content in a content distribution network. As shown in FIG. 2, master content published by a content source can be received in an intermediate transcoding process 230. Once received, a set of transcoding conditions 220 can be evaluated. Specifically, the transcoding conditions 220 can include conditions for selecting individual or sets of transformations 210 to be applied to the master content 240 to produce transcoded content 250.

For instance, the transcoding conditions 210 can include the identification of the type of content to be transcoded, the type or types of transformations which have been requested, one or more transcoding policies, the identity of the content sink such as the group membership of the content sink, and the locality, though the conditions enumerated herein are not an exclusive list of conditions suited for use in the present invention. Notably, the transcoding policies can include not only the transcoding policies of the content owner, but also the transcoding policies of the platform owner and the transcoding policies of the content distribution network.

Based upon the evaluation of one or more of the transcoding conditions 220, one or more transformations 210 can be applied to the master content 240 to produce the transcoded content 250. Notably, the actual transformations can be applied either internally in the intermediate transcoding process 230, or by reference to a Web service providing an accessible transcoding process. In any case, the identity both of the master content 240 and the transcoded content 250, as well as indicative transcoding process data can be associated with the transcoded content 250. Subsequently, the transcoded content 250 with the associated data can be forwarded to a content sink in the content distribution network. Notably, where the content sink can cache the transcoded content 250, once received by a content sink the transcoded content 250 can be suitably cached according to the identity of the master content 240, the transcoded content 250 and the indicative transcoding process data.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for intermediate transcoding in a content distribution network, the method comprising the steps of:
   receiving master content from a content source while said master content is in transit from said content source to a content sink in the content distribution network;
   evaluating a set of conditions for selecting particular ones of associated transformations to be applied to said master content;
   applying at least one selected transformation to said master content according to said evaluated set of conditions, said application producing transcoded content, wherein said applying step comprises the steps of:
      invoking at least one remotely disposed Web service configured to perform at least one of said selected particular ones of said associated transformations, and
      receiving said transcoded content from said invoked at least one remotely disposed Web service; and,
   forwarding said transcoded content to said content sink in the content distribution network.

2. The method of claim 1, wherein said forwarding step comprises the step of forwarding said transcoded content to at least one edge server in the content distribution network.

3. The method of claim 1, wherein said forwarding step comprises the step of forwarding said transcoded content to a master content distribution server in the content distribution network, said master content distribution server forwarding said transcoded content to at least one edge server.

4. An intermediate content transcoder comprising:
   a communicative receiver configured to receive master content from a content source, and a communicative transmitter configured to transmit transcoded content to at least one content sink;
   a set of content transformations;
   a set of conditions for selecting individual ones of said content transformations to be applied to master content received through said communicative receiver; and,
   a transcoder configured to apply said selected individual ones of said content transformations to said master content, said application producing transcoded content, said communicative transmitter forwarding said produced transcoded content to said at least one content sink, wherein
   said transcoder is remotely disposed in at least one Web service, and
   said communicative transmitter further comprises a transcoding data appending processor for appending to said transcoded content data which identifies at least said master content, said transcoded content and said set of conditions.

5. The intermediate content transcoder of claim 4, wherein said set of conditions comprises at least one of master content type, type of transformation requested, a transcoding policy, content sink identity, and locality.

6. A machine readable storage having stored thereon a computer program for intermediate transcoding in a content distribution network, the computer program comprising a routine set of instructions for causing the machine to perform the steps of:
   receiving master content from a content source while said master content is in transit from said content source to a content sink in the content distribution network;
   evaluating a set of conditions for selecting particular ones of associated transformations to be applied to said master content;
   applying at least one selected transformation to said master content according to said evaluated set of conditions, said application producing transcoded contents, wherein said applying step comprises the steps of:
      invoking at least one remotely disposed Web service configured to perform at least one of said selected particular ones of said associated transformations, and
      receiving said transcoded content from said invoked at least one remotely disposed Web service; and,
   forwarding said transcoded content to said content sink in the content distribution network.

7. The machine readable storage of claim 6, wherein said forwarding step comprises the step of forwarding said transcoded content to at least one edge server in the content distribution network.

8. The machine readable storage of claim 6, wherein said forwarding step comprises the step of forwarding said transcoded content to a master content distribution server in the content distribution network, said master content distribution server forwarding said transcoded content to at least one edge server.

* * * * *